United States Patent [19]

Pointner et al.

[11] Patent Number: 4,607,268
[45] Date of Patent: Aug. 19, 1986

[54] MULTIPLE NEEDLE RECORDING ELECTRODE

[75] Inventors: Martin Pointner, Kirchseon; Ruediger Sommer, Raisdorf, both of Fed. Rep. of Germany

[73] Assignee: Dr.-Ing. Rudolf Hell GmbH, Fed. Rep. of Germany

[21] Appl. No.: 730,175

[22] Filed: May 3, 1985

Related U.S. Application Data

[62] Division of Ser. No. 488,380, Apr. 25, 1983, Pat. No. 4,540,151.

[30] Foreign Application Priority Data

May 7, 1982 [DE] Fed. Rep. of Germany ....... 3217290

[51] Int. Cl.[4] ...................... G01D 15/06; G01D 15/16
[52] U.S. Cl. ................................. 346/155; 346/139 C
[58] Field of Search ........................... 346/155, 139 C

[56] References Cited

U.S. PATENT DOCUMENTS

| | | | |
|---|---|---|---|
| 2,974,368 | 3/1961 | Joyce | 249/93 |
| 3,542,328 | 11/1970 | Deitrick | 249/95 |
| 3,801,057 | 4/1974 | Kato | 425/123 |
| 3,847,342 | 11/1974 | Matsuura | 249/95 |
| 4,165,514 | 8/1979 | Ishima | 346/155 |
| 4,378,631 | 4/1983 | Head et al. | 29/825 |

FOREIGN PATENT DOCUMENTS

| | | | |
|---|---|---|---|
| 2228245 | 11/1974 | France | 346/155 |
| 485125 | 10/1953 | Italy | 249/95 |

OTHER PUBLICATIONS

Modern Dielectric Materials, 1960, pp. 127–130, Birks et al.

Primary Examiner—E. A. Goldberg
Assistant Examiner—Linda M. Peco
Attorney, Agent, or Firm—Hill, Van Santen, Steadman & Simpson

[57] ABSTRACT

A single piece electrode comb or device includes two circuit boards having conductor paths and two separate rows of needle-like recording electrodes which are electrically connected to separate paths of the respective circuit board encapsulated in a single plastic resin body with the electrode rows extending to a recording edge formed in a rib along one edge of the body. To form the electrode comb, a device having two substantially similar rectangular cross-sectional shaped halves is assembled in one position to form a winding core on which a wire is wound with a plurality of turns, clamped and joined to the respective circuit boards which are mounted on faces of the two halves, subsequently the wires are separated along a parting plane and the two halves are disassembled with one being rotated 180° relative to its previous position so that the faces with the recesses are adjacent each other to form a casting mold into which a plastic resin is injected to encapsulate the wires which after hardening of the plastic are trimmed back at least along the recording edge.

2 Claims, 9 Drawing Figures

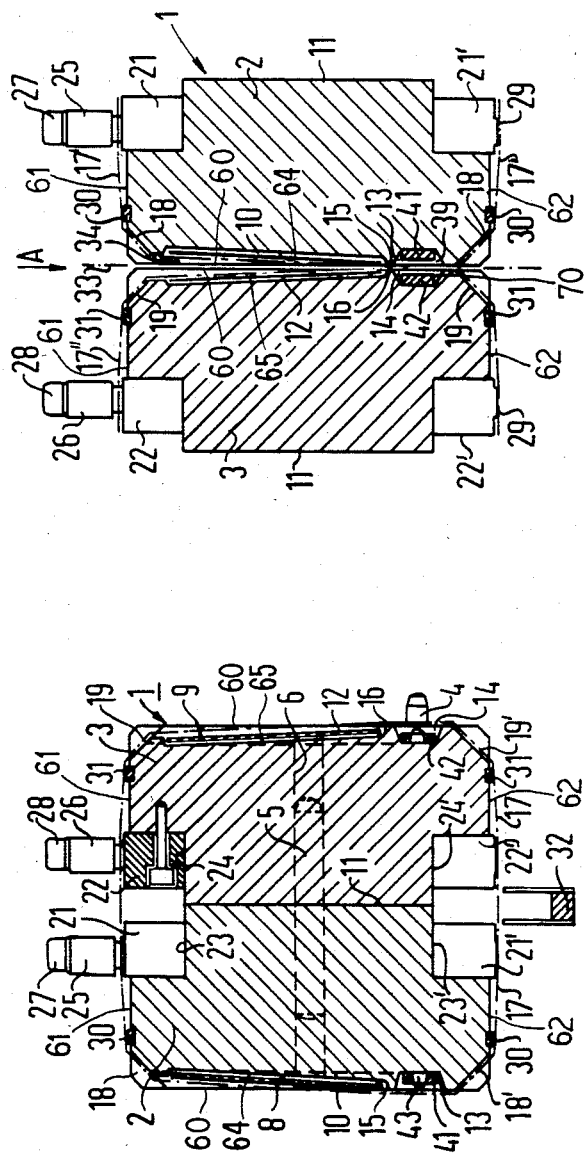

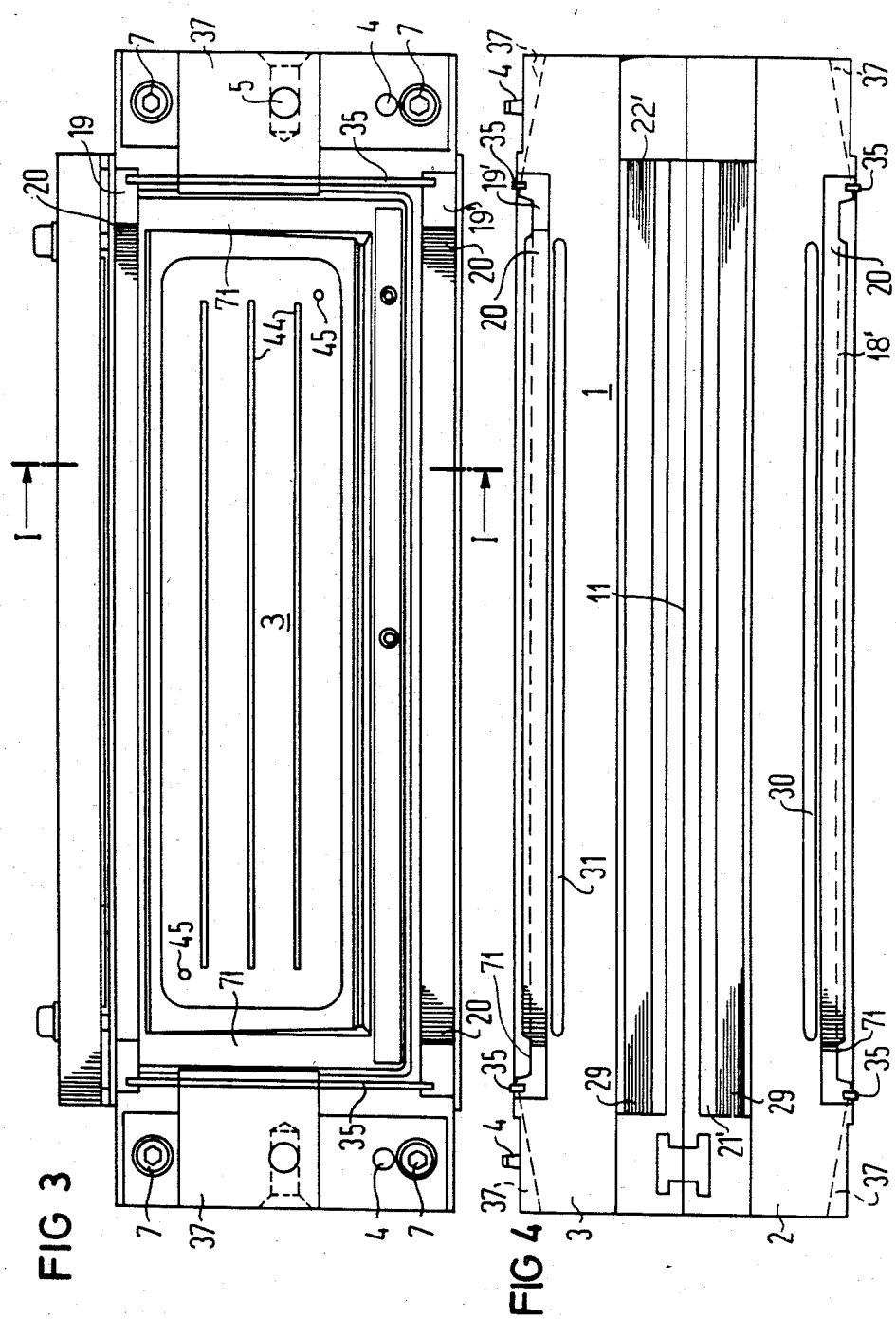

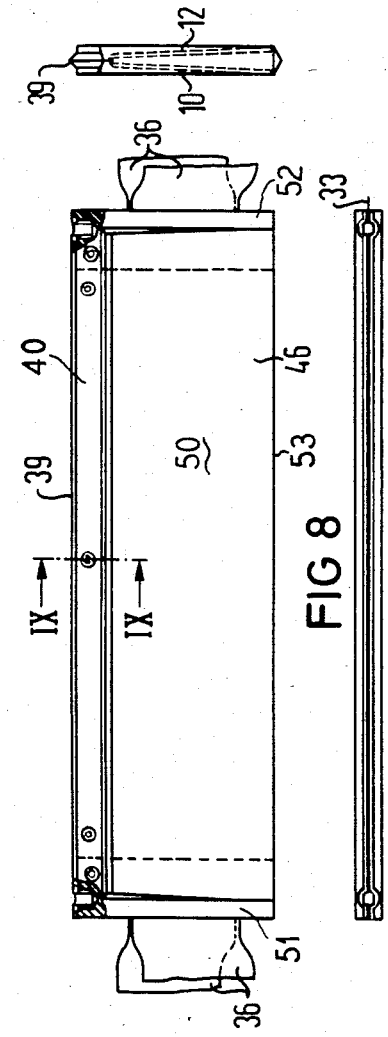

MULTIPLE NEEDLE RECORDING ELECTRODE

This is a division of application Ser. No. 488,380, filed Apr. 25, 1883, which issued as U.S. Pat. No. 4,540,151 on Sept. 10, 1985.

BACKGROUND OF THE INVENTION

The present invention is directed to an electrode comb or device and a device and method for manufacturing an electrode comb which has at least two rows of wire pieces acting as needle-like recording electrodes which are arranged in a rib of a molded body with the wires of one row being offset by half the distance between the wires of the second row. The method and the device include providing a mold member composed of two halves which are assembled together in one position to form a winding core which has recesses on opposite outer surfaces and on which a wire is wound with the turns being joined to circuit boards disposed in the recesses clamped and severed. Then the two halves are disassembled and reassembled with the recesses facing each other to form a mold cavity into which a resin compound is injected to form the electrode comb. Subsequent to hardening of the resin compound, the exposed ends of the wires are trimmed to be flush with the surface of a recording edge of the molded body.

Electrode combs which have at least one row of needle-like recording electrodes are required for producing exact copies of a master on a copy paper. The combs are utilized to charge point-by-point the copy paper in accordance with the electrode arrangement so that a toner will adhere to the corresponding points when it is applied. In order to obtain a high recording quality of eight points per millimeter, the electrodes are usually disposed in two rows having respective spacing of 250 um and the electrodes in one row are offset by 125 um from the electrodes of the other row. Thus, the electrode comb generally contains up to 2000 recording electrodes, which are disposed parallel to one another and are fixed by means of a thermosetting plastic resin. For the purpose of manufacturing such needle electrodes, a wire is usually wound on a winding core or mold with each turn of the winding having a specific lead or pitch. After the individual windings are fixed with the assistance of the thermosetting resin, the individual windings are again severed.

A device for manufacturing an electrode comb composed of numerous needle-shaped electrodes is disclosed by German No. LP 22 61 529. A multi-part mold having an upper and lower mold part is utilized. The lower mold part has a planar top surface and an essentially convexly rounded underside. In the upper area or top surface, lateral faces of the lower mold part have planar surface parts against which printed circuit boards are seated. After a wire has been wound around the lower mold part, each of the turns is connected such as by soldering to conductor paths or circuits of each circuit board. The upper surface of the lower mold part has two rectangular recesses which extend parallel to one another and to the longitudinal axis of the part and these recesses receive an injection or casting resin compound. An upper mold part has a surface corresponding to the upper surface of the lower mold part with corresponding recesses. Thus, after a wire has been wound on the lower mold part with the windings having a predetermined, mutual spacing and the wires being secured to the appropriate conductor paths in the circuit boards, the upper mold part is then placed on the upper surface of the lower mold part. Subsequently, the resin compound is injected into the cavities of the two mold parts to form two resin strips with a respective row of recording electrodes therein. After hardening of the resin, the part of the wire winding extending between the two recesses is cut so that two units with each having a resin strip containing a row of needle-shaped electrodes are produced. The two faces of these two parts are joined together to form the electrode comb. The joining of the two strips must be undertaken with the needle electrodes of the two rows being mutually offset so that the needles of the one row are respectively opposite the space between the two needles of the other row and such that the ends of the needles proceed in two straight longitudinal rows from one end to the other end of the part. This presupposes not only a very precise manufacturing of the strips containing the rows of electrodes but a rather precise joining of the two strips as well. Another disadvantage of the comb provided in this manner is that the strips containing the rows of electrodes are connected to each of the printed circuit boards only by the flexible wires of the winding so that there is always the hazard of damaging the individual wires.

SUMMARY OF THE INVENTION

The present invention is directed to a one-piece electrode comb which forms a compact unit together with its circuit boards and to a method and device utilized in manufacturing this electrode comb.

To obtain these objects, the present invention is directed to an electrode comb having two rows of needle-shaped recording electrodes extending to a recording edge, said comb comprising a one-piece molded body of a resin compound having a rib with said recording edge along one edge of the body, said body containing two circuit boards with conductor paths and two rows of needle-shaped recording electrodes with the electrodes of one row being connected to the circuit paths of one circuit board and the electrodes of the other row being connected to the circuit paths of the other circuit board, the electrodes of each row being evenly spaced apart and said two rows of needle-shaped electrodes extending to an outer surface of said recording edge of said rib with the electrodes of one row being offset from the electrodes of the other row by an amount equal to one-half the spacing between the electrodes of each row.

To produce such an electrode comb, the present invention is also directed to a device comprising a mold member being composed of two symmetrically constructed halves with a rectangular cross-section, each half having a first face with a flat planar surface, a second face opposite the first face having a first recess for receiving a circuit board and a second recess separated from the first recess by a support surface, third and fourth faces extending between the first and second faces, each of said third and fourth faces having recesses adjacent the first face, one of the third and fourth faces having means for clamping wires to said surface; means for holding the halves with said first surface engaging each other to form a parting plane of a winding core with the second faces being faced in the opposite direction to receive circuit boards in each of the first recesses, and means for holding the two halves together with the second faces adjacent each other to form a first mold cavity from the first recesses and a second mold cavity from the second recesses with the two rows of wires extending through said cavities.

The method of the present invention utilizes the above mentioned device and after having the two halves held together with the first faces forming the parting plane of the winding core, includes inserting a circuit board in each of the first recesses, winding a wire around the winding core while maintaining the desired spacing and pitch of each turn, then securing each of the wires to the respective circuit paths of the circuit boards, clamping the wires with the clamping means to each half, then severing the wire of each turn at two points adjacent the parting plane, disassembling the two halves and reassembling the halves of one of the halves being rotated 180° so that the second faces are adjacent each other to form the mold cavities with the wires extending therethrough; injecting a molding compound such as a resin compound into each of the mold cavities subsequently after the resin compound hardens trimming the exposed portions of the wires to lie flush with the surfaces of the molded material.

The symmetrical design of each of the halves of the mold member significantly facilitates the manufacture of the electrode comb. After winding the wire onto the winding core and electrically contacting each of the turns to its respective circuit path in the circuit board, the electrode comb can be manufactured in a single casting operation with all of the wires forming the needle electrodes being in the desired row with the corresponding spacing. The flat recesses in the winding halves of the winding core for the printed circuit boards are preferably designed so that the circuit boards lie symmetrically at an acute angle relative to the planar surface of the second face and also to the planar surface of the first face. Thus, the manufacture of a compactly encapsulated single piece electrode comb with the printed circuit boards included therein is possible. This has the considerable advantage that shorts and wire breaks are reliably excluded. The slightly slanting disposition of the circuit boards moreover also guarantees a reliable support of each of the wires against the support stay or surface of the second face. Thus, the needle-like recording electrodes are disposed precisely parallel and the two winding halves are pinned obliquely relative to one another during the casting operation in order to compensate for the angle of thread pitch. An additional support surface is also advantageously provided so that the two wire position planes lie parallel to each other. The additional support surface is manufactured without a thread pitch for the reason of fabrication technology. The wires are covered with a template immediately after they are wound and are secured with a spray lacquer only in the support area so that they may retain the precision of the winding pitch.

Fiberglass reinforcing strips can be inserted into the second recesses in order to stiffen the electrode comb in the comb area. The positioning of the reinforcing strips preferably occurs with conical pins so that the mold parts can be easily separated after the molding operation.

In a preferred embodiment, the bottom surface of the recess receiving the circuit boards is equipped with channels which have a truncated triangular cross-section. They serve for suctioning of the connecting plates provided with a suction bore when the leads are soldered onto the circuit paths. The truncated triangular cross-section of the channels enables easy disassembly of the cast parts.

BRIEF DESCRIPTION OF THE DRAWINGS

FIG. 1 is a cross-sectional view taken on the lines I—I of FIG. 3 of the device of the present invention while assembled as a winding core;

FIG. 2 is a cross-sectional view similar to that of FIG. 1 with the device of the present invention assembled as a casting mold;

FIG. 3 is a side view of the device of the present invention assembled as a winding core as illustrated in FIG. 1;

FIG. 4 is a bottom view of the device of the present invention assembled as a winding core as illustrated in FIG. 1;

FIG. 6 is a side view of an electrode comb manufactured in accordance with the present invention with portions broken away for purposes of illustration;

FIG. 7 is an end view of the electrode comb of FIG. 6;

FIG. 8 is a top view of the electrode comb of FIG. 6; and

FIG. 9 is an enlarged cross-sectional view taken on the lines XI—XI of FIG. 6.

DESCRIPTION OF THE PREFERRED EMBODIMENTS

Figure 5:
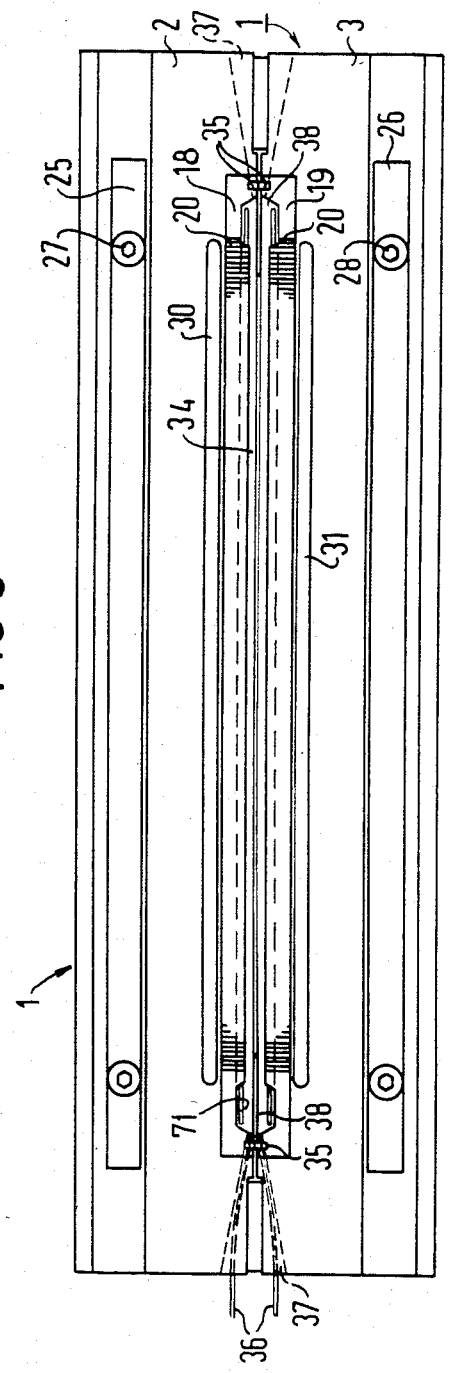
FIG. 5 is a top view of the device of the present invention assembled as a casting mold as illustrated in FIG. 2.

The principles of the present invention are particularly useful for producing an electrode comb or device 46 (see FIGS. 6-9) which has a body portion 50 that has a resin strip or rib 40 extending along one edge. The resin strip 40 on an outer surface has a recording edge 39. At each end of the body 50, reinforcing ribs 51 and 52 are provided. The body between the reinforcing ribs 51 and 52 and the rib 40 tends to taper in thickness from a maximum size at an edge 53 opposite the rib 40 to a minimum thickness adjacent the rib 40.

The device or comb 46 includes a pair of circuit boards 10 and 12 which have a plurality of conductor paths which are connected by ribbon conductors 36 that extend out of the ends of the body 50 for connection to a control circuit. In addition, the device 46 has a first row 55 (FIG. 9) of needle-shaped recording electrodes with each of the electrodes having an even spacing and being connected to separate conductor paths of the circuit board 10. In a similar manner, a second row 56 of needle-shaped recording electrodes are connected to the conductor paths of the circuit board 12. Both rows 55 and 56 while in the rib 40 extend parallel to each other with the electrodes of the row 56 being positioned to be offset by half the spacing therebetween from the electrodes of the row 55 so that the electrode in the row 56 is opposite a space between two adjacent electrodes in the row 55. As illustrated, the electrodes in both rows 55 and 56 extend to the recording edge 39.

In order to manufacture or produce the device 46, the present invention is directed to a device or mold member generally indicated at 1 in FIG. 1 which member is composed of two halves 2 and 3 which are symmetrical. When the halves are arranged as illustrated in FIG. 1, the device or mold forms a winding core and when the halves 2 and 3 are assembled as illustrated in FIG. 2, the device 1 then is a casting or injection mold.

As illustrated, each of the halves 2 and 3 have a substantially rectangular cross-section with a first face 11 which has a flat planar surface. Opposite the first face 11, each of the halves has a second face 60 which is interconnected to the first face 11 by a third face 61 and a fourth face 62. As mentioned hereinabove, each of the halves 2 and 3 is absolutely identical with the sole difference being that the half 3 has two set pins 4 which extend from the second face 60 and are received in corresponding bores that are provided in the second face 60 of the half 2 to enable assembling the two halves as a casting mold as illustrated in FIGS. 2 and 5. The adjustment or positioning of the two halves 2 and 3 while assembled as illustrated in FIGS. 1, 3 and 4 to form a winding core is obtained by means of set pins 5 which are inserted in corresponding bores 6 of the two havles. The device 1 includes means for holding the two halves together in both the winding position as illustrated in FIG. 1 and in the molding position as illustrated in FIG. 2 which means utilizes four sets of nuts and bolts 7 (FIG. 3).

The second face 60 of the half 2 has a rectangular recess 8 which receives a circuit board 10. In a similar manner, the second face 60 of the half 3 has a recess 9 for receiving the circuit board 12. The recess 8 has a bottom or inclined surface 64 while the recess 9 has a bottom or inclined surface 65 and each of the bottom or inclined surfaces 64 and 65 extend in a plane that forms an acute angle with both the remaining surfaces of the face 60 as well as the plane of the surface forming the first face 11. As illustrated, these two planes of the bottom surfaces 64 and 65 are symmetrical relative to the plane of the first faces 11. The second face 60 of the first half immediately below the recess 8 has a recess 13 which is spaced by a support surface 15 therefrom. In a similar manner, the second half 3 on the second face 60 has a recess 14 which is spaced from the recess 9 by a support surface 16. The support surfaces 15 and 16, as will be explained hereinafter, form support stays for holding the individual turns of a wound wire 17 which is indicated in dot-dash lines in FIGS. 1 and 2.

As illustrated in FIGS. 1 and 2, the third face 61 of the half 2 has a recess 23 adjacent the first face 11. In a similar manner, the fourth face 62 has a recess 23'. The other half or second half 3 on its third face 61 has a recess 24 adjacent the first face 11 and the fourth face 62 has a recess 24' adjacent the first face 11. In addition, the corner between the third face 61 and the second face 60 is of the half 2 provided with a bevel 18 while the corner between the second face 60 and the fourth face 62 is provided with a bevel 18'. In a similar manner, the corner between the first face 60 and the third face 61 of the second half 3 has a bevel 19 with a bevel 19' being positioned at the corner between the fourth face 62 and the second face 60. Each of these bevels 18, 18', 19 and 19' can be provided with means 20 for maintaining a mutual spacing and pitch for a wire 17 which is wound on the core. This means 20 can be a series of grooves as illustrated in FIG. 3.

After the circuit boards 10 and 12 have been inserted in the recesses 8 and 9 of the halves 2 and 3 which are arranged as a winding core, a wire 17 is wound onto the two halves with the turns of each winding having a slight lead of approximately 250 um in a circumferential direction. In order to hold the turns of the wire precisely as determined, the means 20 for maintaining a predetermined mutual spacing between turns and pitch for the turns is utilized. After the individual turns have been wound and contacted to the corresponding circuit paths of each of the circuit boards 10 and 12 such as by soldering, the winding wire 17 is clamped by means of clamp strips 21 and 22 which are received in the recesses 23 and 24 of the halves 2 and 3 adjacent the third face. The clamp strip 21 coacts with a clamp strip 25 that is urged into tight engagement therewith by threaded members such as screws 27. In a similar way, the clamp strip 22 coacts with a clamp strip 26 which is urged thereagainst by threaded fasteners or screws 28. In addition, the recesses 23' and 24' which are associated with the fourth surface receive clamp strips 21' and 22' respectively. Each of these clamp strips 21' and 22' are provided with a sawtooth configuration 29 (FIG. 4) with the saw teeth extending opposite to the direction of tension on the wire. Each of the clamp strips such as 21 and 21', 22 and 22' as well as the strips 25 and 26 are composed of hardened steel. In order to maintain a prestress on the wound turns of the wire 17, rubber strips 30 are provided on the surfaces of the faces 61 and 62 of the first half 2 while the second half 3 has rubber strips 31 on its faces 61 and 62.

After winding the wire 17 onto the core which is formed with the halves 2 and 3 assembled as illustrated in FIGS. 1, 3 and 4, the wire is clamped as mentioned and then the turns are cut or severed on the parting plane 11 or parallel thereto. This cutting can be done by utilizing a double guillotine shear 32 which coacts with the hardened strips such as 21' and 22' to cut the wires. After severing the turns, the halves 2 and 3 are disassembled and one of the halves such as the half 2 with its clamped wires 17' is rotated through 180° so that the second faces 60 of the two halves are facing each other as illustrated in FIG. 2 with the two rows of wires 17' and 17''. As mentioned hereinbefore, the set pins 4 of the half 3 are received in the bores of the half 2 to determine the alignment.

With the halves 2 and 3 assembled in the second position such as illustrated in FIG. 2, the recesses 8 and 9 form a first cavity 34 which has a wedge-shaped cross-section due to the fact that the bottom surfaces 64 and 65 extend at an angle to the surface of the second faces 60. Thus, the circuit boards 10 and 12 will assume a slightly inclined position relative to one another and be symmetrical to a comb plane 33 whereas the surfaces of the support surfaces 15 and 16 are disposed parallel to one another. In addition, the recesses 13 and 14 will form a second cavity 70 which, after it is filled with the plastic resin, will eventually form the rib or resin strip 40 which is best shown in FIG. 9. The resin is inserted into the cavity from the top as indicated by the arrow A and in order to prevent lateral escape of the resin, sealing strips 35 (FIGS. 3–5) are provided and act to terminate the cavity to form the ends of the body 50. The sealing strips 35, however, do allow the tape-shaped leads 36 of each circuit or printed circuit board 10 and 12 to be passed through the end of the mold. To facilitate this, web-shaped emission openings or grooves 37 (FIGS. 3–5) are provided in each of the halves 2 and 3. Each of the cavities or recesses, which receive the circuit boards as best illustrated in FIGS. 4 and 5 adjacent the sealing strips 35, are enlarged as indicated at 71 so that the cavity 34 has enlarged cavities or portions 38 to produce the end beads or ribs 51 and 52 as illustrated in FIG. 6. These enlarged beads 51 and 52 act to stabilize the body 50.

After the cavities 34 and 70 have been filled, the actual recording edge 39 will occur at a lower end of the cavity 70 as illustrated in FIG. 2. The projecting portion of the wires 17' and 17'' are trimmed and removed at the recording edge 39 to be flush with the surface thereof. Thus, the wires that remain are the pieces which are embedded in the rib 40 and form the actual needle-shaped recording electrodes. So that the changes in the presentation patterns are not produced in the followup work of the recording edge 39, the wires must be conducted to extend parallel to one another at least in the rib portion 40. To this end, the halves 2 and 3 when pinned together are pinned at a slight relative slant to one another in order to compensate for the angle of the thread pitch during winding of the wire 17 on the winding core.

In order to reinforce the rib 40, it is desirable to include fiberglass reinforcing strips 41 and 42 as illustrated in FIG. 9. In order to do this, the strips 41 and 42 are inserted in the recesses 13 and 14 (FIG. 1) prior to filling the mold with the resin. To hold the strips in the particular recesses 14 and 13, conical pins 43 are provided and enable easy removal of the molded part with the reinforcing strips after the molding operation. The conical pin will leave conical pin holes 43' (FIG. 9) which serve a fixing points in the cast comb for the first ply of the wound wire.

As best illustrated in FIG. 3, the bottom surfaces such as 64 and 65 of the recesses 8 and 9 can be provided with parallel channels such as 44. Each of these channels taper down to a bottom which is flat so that they have a substantially truncated triangular cross-section. The grooves 44 serve the purpose of suctioning the circuit or printed circuit boards 10 or 12 with a suction bore when the conductor paths are soldered to the individual wire turns. The particular cross-sectional shape of each of the channels 44 enable easy removal of the cast part from the mold after the molding operation.

The adjustment of the circuit or printed circuit boards preferably occurs after the winding of the wire on the core. Pins 45 (FIG. 3) serve the purpose of pre-centering and therefore exhibit a fitting sleeve which can be removed from above for adjustment after the winding step.

As mentioned hereinabove, to provide a connection for each of the needle-shaped electrodes of a single row, a single circuit board is provided and has a plurality of conductor paths. The electrodes are connected to the individual conductor paths in a grid dimension of approximately 250 um. At the same time, a test electrical strength of 500 volts must be guaranteed. In order to achieve this, each of the conductor paths of the circuit board are completely covered with a temperature-proof insulation so that the solderable insulation of the neighboring wire is not destroyed from below due to the thermal conductivity of the conductor paths.

For increasing the electrical and thermal insulation, the tracks or paths of the circuit boards are preferably completely provided with the temperature-proof insulation and are only exposed at those points where they are to be connected to an electrode. If need be, these exposed areas can be metallically elevated up to the upper edge of the insulating layer and can be provided with a solder surface for a reliable connection.

Although various minor modifications may be suggested by those versed in the art, it should be understood that we wish to embody within the scope of the patent granted hereon, all such modifications as reasonably and properly come within the scope of our contribution to the art.

We claim:

1. An electrode comb having two rows of needle-shaped electrodes extending to a recording edge, said comb comprising a one-piece molded body of resin having a rib along one side of the body with said recording edge along one edge of the rib, said body containing two circuit boards, each circuit board having a length, width and conductor paths on one surface, said circuit boards being positioned in the body with the one surface having the conductor paths facing each other, two rows of needle-shaped recording electrodes extending from said recording edge and across the width of the two circuit boards with the electrodes of one row being connected to the conductor paths of one circuit board and the electrodes of the other row being connected to the conductor paths of the other circuit board, the electrodes of each row being evenly spaced apart and said two rows of needle-shaped electrodes extending to an outer surface of said recording edge with the electrodes of one row being offset from the electrodes of the other row by an amount equal to one-half the spaceing between the electrodes of each row, at least one reinforcing strip having a length of at least the length of the circuit board being embedded in said rib adjacent to said rows of needle-shaped recording electrodes, and each of the circuit boards being provided with a temperature-proof insulation on each of the conductor paths except at the point of connection of each path to its respective electrode.

2. An electrode comb according to claim 1, wherein each of the conductor paths of each of the circuit boards has an elevated solder surface at the point of connection of the electrode to the conductor path.

* * * * *